Nov. 28, 1961   G. D. GILMORE   3,010,155
INTERNALLY HEATED NOZZLE AND MOLDING METHOD
Filed Feb. 5, 1959
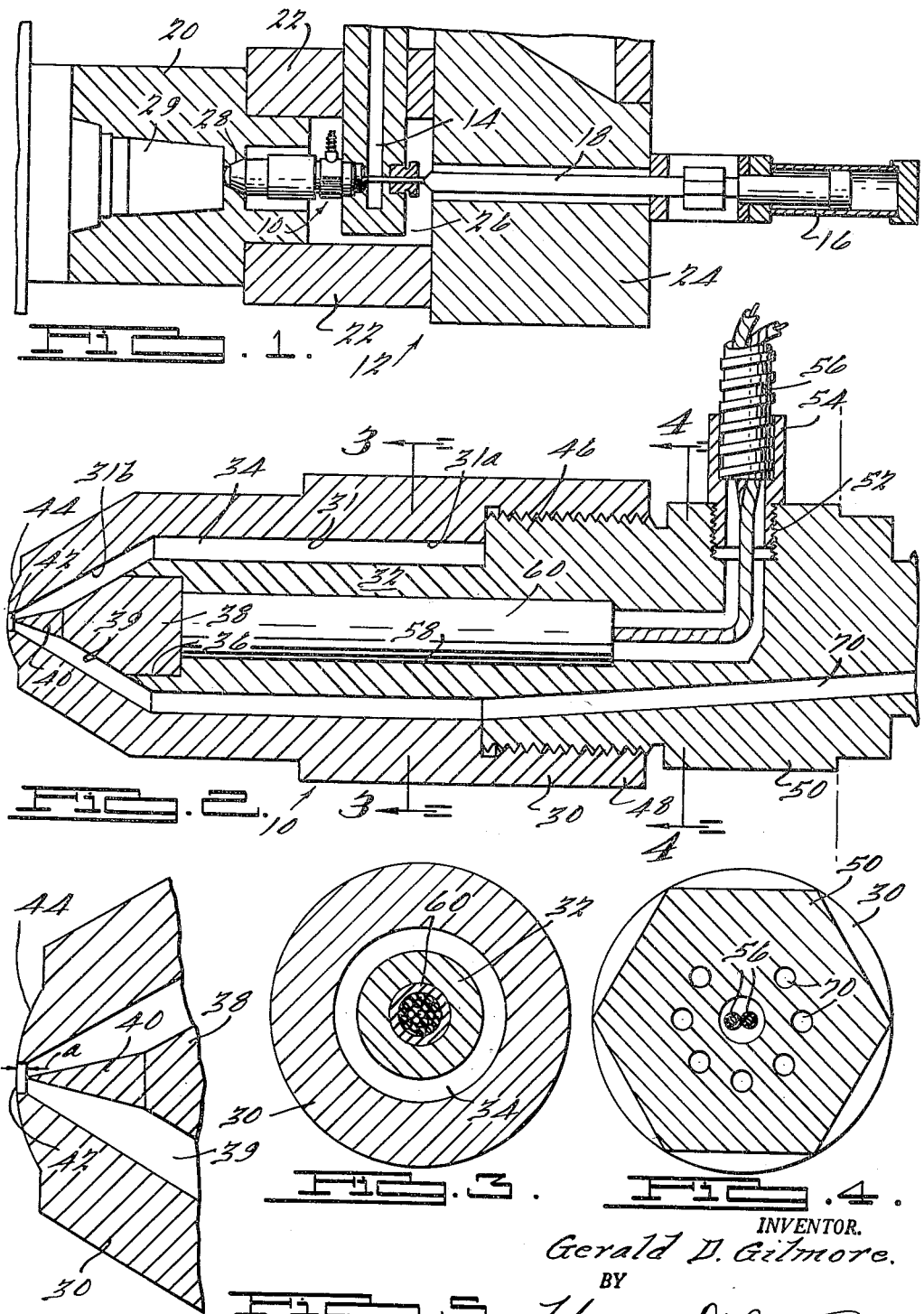
INVENTOR.
Gerald D. Gilmore.
BY
Harness, Dickey & Pierce.
ATTORNEYS.

United States Patent Office 3,010,155
Patented Nov. 28, 1961

3,010,155
INTERNALLY HEATED NOZZLE AND MOLDING METHOD
Gerald D. Gilmore, Rochester, Mich., assignor to Bopp-Decker Plastics, Inc., Rochester, Mich., a corporation of Michigan
Filed Feb. 5, 1959, Ser. No. 791,444
7 Claims. (Cl. 18—30)

This invention relates generally to heated nozzles and more particularly to an internally heated nozzle.

The heated nozzle of this invention is particularly adapted for use in injection molding machines and is described herein in connection with such a machine. However, it is to be understood that the nozzle has general utility and is not limited to this single use. In conventional injection molding machines, there is a danger that the molten plastic at the nozzles will "freeze off" during prolonged interruptions in the molding cycle. In addition, sprues are formed on the molded plastic parts because the plastic at the nozzles solidifies and is withdrawn along with the molded part. In this connection it is to be understood that as used heren, the term "nozzle" includes sprue bushings which are used for injecting molding material into the connecting line between a plurality of mold cavities.

It is an object of this invention, therefore, to provide an improved heated injection nozzle to thereby maintain the plastic at the tip or discharge end of the nozzle in a softened condition.

A further object of this invention is to provide an injection nozzle with an annular passage for molten plastic and a heater which is disposed within the space bounded by the passage.

Further objects, features and advantages of this invention will become apparent from a consideration of the following description when taken in connection with the appended claims and the accompanying drawing in which:

FIGURE 1 is a sectional view of a portion of an injection molding machine provided with the heated nozzle of this invention;

FIGURE 2 is an enlarged sectional view of the nozzle shown in FIG. 1;

FIGS. 3 and 4 are sectional views looking along the lines 3—3 and 4—4 in FIG. 2; and FIGURE 5 is an enlarged sectional view of the tip or discharge portion of the nozzle of this invention.

With reference to the drawing, the nozzle of this invention, indicated generally at 10, is illustrated in FIG. 1 mounted in a conventional injection molding machine 12, only a portion of which is shown. The machine 12, which is described in more detail in copending application Serial No. 621,842, filed November 13, 1956, now Patent No. 2,912,719 and owned by the assignee of this invention, includes the usual heating structure and an injection plunger (not shown) for forcing molten plastic into a manifold 14 which communicates wth a plurality of discharge nozzles 10 (only one of which is shown). A valve 16 operates a reciprocally movable rod 18 which is operable in one position to provide for a flow of molten plastic from the manifold 14 to the nozzle 10 and in another position to shut off this flow.

The mold cavity is formed by mating male and female dies and only the female die 20 is shown in FIG. 1. It is mounted by means of mounting members 22 on a fixed platen 24. As shown in FIG. 1, the die 20 is separated from the platen 24 by a space 26 and the manifold 14 projects from one side into this space 26.

The rear end of the nozzle assembly 10 is supported on the manifold 14 for receiving molten plastic therefrom and projects into an opening 28 in the female die 20 which communicates with the mold cavity 29 in the die 20.

The nozzle assembly 10 consists of an outer sleeve 30 provided with an axial cavity 31 and an inner body 32 which extends into the cavity 31. The cavity 31 has a first portion 31a which is cylindrical and an end portion 31b which is of a generally frusto-conical shape. A discharge orifice 42 in the sleeve 30 communicates with the small end of the cavity 31b. The body 32 is of a uniform diameter within the cavity portion 31a so as to form an annular passage 34 between the body 32 and sleeve 30. A tapered spreader member 38, which terminates at its forward end in a pointed portion 40, has its rear end disposed in a central cavity 36 in one end of the body 32 and is silver-soldered to the body 32. The spreader member 38 is disposed within the cavity portion 31b so as to form an annular converging passage 39 about the spreader member 38 which communicates with the annular passage 34 and constitutes a forward extension thereof. The passage 38 terminates at its forward end in the discharge orifice 42 which is formed centrally in the end surface 44 of the sleeve 30. This end of the sleeve 30 is shaped to conform to the desired shape of the inner end of the mold cavity 29.

The body 32 is formed adjacent its rear end with an enlarged portion 46 which is threaded into an internally threaded end portion 48 on the sleeve 30 to assemble the sleeve 30 and the body 32. A hexagonally shaped end section 50 of the body 32 projects outwardly of the sleeve 30 and is formed on one side with an internally threaded cavity 52 into which a fitting 54 is threaded. The fitting 54 projects outwardly from one side of the body 32 into the space 26 between the female die 20 and the platen 24.

Disposed in an axial bore 58, formed in the body 32 in communication with the cavity 36, is a cartridge type electric heater 60 having leads 56 which are supported in the fitting 54 and are connected to a suitable source of electric current.

In the use of the nozzle assembly 10 in the machine 12, molten plastic is supplied from the manifold 14 to the annular passage 34 through inclined passages 70 in the body 32 when the rod 18 is in a position permitting flow of plastic from the manifold 14 into the passages 70. This plastic is discharged from the orifice 42 into the cavity 29. When the rod 18 is moved to a position shutting off this flow of plastic, the plastic remaining in the annular passage 34 is maintained in a heated molten condition by the heater 60. By virtue of the location of the heater 60 so that it is surrounded by the annular passage 34, heat from the heater 60 must pass through the plastic in the passage 34 before being lost through the sleeve 30 to the female die 20.

It has been found that the layer of plastic in the passage 34 which is adjacent to the sleeve 30 chills slightly to form a skin-like layer which prevents heat loss to the sleeve 30 and acts as an insulator to hold the heat within the passage 34 where the heat is required. Furthermore, undesirable heating of the female die is avoided. By virtue of the fact that substantially all the heat from the heater 60 is utilized, a small capacity heater can be effectively used and its useful life is prolonged.

Since the spreader 38 is in a heat exchange relation with the heater member 60, and formed preferably of steel or a similarly good heat conductor, it is rapidly heated by the heater member 60 so as to maintain the plastic in the passage 39 in a molten condition. The tip portion 40 of the spreader 38 is disposed so that the space, indicated at $a$ in FIG. 5, between the tip 40 and the discharge orifice 42 is no more than one-tenth of an inch. This proximity of the tip 40 to the discharge orifice 42 maintains the plastic in the discharge orifice in a soft condition so that it will not plug the discharge orifice 42. Consequently, when there is a prolonged interruption in the molding cycle, flow of molten plastic through the discharge orifice 42 is readily resumed when the machine is again operated.

Furthermore, because the plastic at the discharge orifice 42 is continually maintained in a molten condition, a clean break is always provided at this point between the molded part and the plastic remaining in the nozzle 10. Consequently, sprues on the molded parts are completely eliminated. By shaping the end surface 44 of the sleeve 30, the desired shape for the adjacent end of the molded part is readily obtained. It is to be understood that the curved shape shown in FIG. 5 is for purposes of illustration only.

An extremely efficient utilization of heat from the heater 60 for heating of the fluid in the passage 34 is accomplished because of the facts that the annular passage 34 accommodates a relatively small volume of fluid, the heater member 60 is surrounded by the passage 34, and the spreader member 38 extends to a position adjacent the orifice 42. Consequently, the nozzle assembly 10 has general utility in applications in which a fluid to be discharged must be heated, and is not limited to use in molding machines.

Although this invention has been particularly described with respect to a preferred embodiment thereof, it is to be understood that it is not to be so limited, since changes can be made therein which are within the full intended scope of this invention as defined by the appended claims.

What is claimed is:

1. A discharge nozzle for a plastic injection molding machine having an orifice at one end thereof for delivering plastic material to the cavity of a mold associated with the nozzle, an internal, centrally disposed heater in said nozzle, a centrally disposed, internal spreader in heat exchange relation with said heater extending therefrom and terminating in essentially close proximity to said orifice, and means forming an annular passage for plastic material extending from said orifice longitudinally through said nozzle, said annular passage disposed radially outwardly from said heater and said spreader and isolating the same from the outer external portion of the nozzle, said annular passage adapted to receive preheated fluidized plastic material and to conduct the same longitudinally of the nozzle, radially outwardly of and around said heater and over and around said spreader to said orifice, said heater constituting the sole heating means associated with said nozzle adjacent to said mold for plastic material in said passage whereby the plastic material forms an annular insulating layer around said heated and said spreader and provides a thin heat insulating layer on the outer unheated surface of said passage which shields the mold from heat in the nozzle and permits essentially rapid cooling and hardening of plastic material in the mold cavity.

2. The combination of elements as defined in claim 1 wherein at least a portion of said passage extending along said heater and said spreader is annular in form and wherein said spreader has a reduced terminal portion which forms the inner wall of a portion of the passage extending from said orifice.

3. The combination of elements as defined in claim 1 wherein said spreader and said heater are mounted in an internal body portion of the nozzle and wherein said body portion is surrounded by an external sleeve which contains said orifice and is spaced radially from said body portion and said spreader to define a portion at least of said passage.

4. The combination of elements as defined in claim 3 wherein said sleeve is threaded on said body portion and is removable to expose said body portion and said spreader.

5. The combination of elements as defined in claim 1 wherein the portion of said spreader adjacent to said orifice is tapered in form and wherein the tapered portion of the spreader has a pointed tip disposed substantially in said orifice.

6. The combination of elements as set forth in claim 5 wherein the distance between the tip of the spreader and the outer end of said orifice is not more than about one tenth of an inch.

7. The method of injection molding thermoplastic resin material comprising passing preheated plastic resin material under pressure through an annular passage in an injection nozzle which passage surrounds an internal heater and spreader in the nozzle to an orifice for discharge into a mold cavity, and maintaining the resin material in said passage essentially plastic and flowable by heating the same internally with said heater and said spreader only during movement thereof through the nozzle and substantially to the outlet end of said orifice while maintaining the outer surface of said passage and said orifice and the portion of the nozzle radially outwardly of the passage relatively cool and unheated, whereby to provide a solidified outer skin or layer of the resin material on the outer wall of the passage, to minimize heating of the mold and other parts adjacent to said nozzle, and to hasten cooling and setting of the material in said mold and correspondingly reduce the cycle time of the injection molding machine of which said nozzle is a part.

References Cited in the file of this patent

UNITED STATES PATENTS

| | | |
|---|---|---|
| 1,370,800 | Egerton | Mar. 8, 1921 |
| 2,319,439 | Burry | May 18, 1943 |
| 2,354,363 | Burry | July 25, 1944 |
| 2,583,329 | Eckert | Jan. 22, 1952 |
| 2,617,151 | Rubin | Nov. 11, 1952 |
| 2,696,641 | Schwartz | Dec. 14, 1954 |
| 2,911,680 | Kelly | Nov. 10, 1959 |

FOREIGN PATENTS

| | | |
|---|---|---|
| 606,879 | Great Britain | Aug. 23, 1948 |